United States Patent
Davis et al.

(10) Patent No.: US 6,186,766 B1
(45) Date of Patent: Feb. 13, 2001

(54) APPARATUS FOR SHAPING HONEYCOMB CORE

(75) Inventors: Ronald M. Davis, Hillsboro; Alonzo W. Franklin, Wichita, both of KS (US)

(73) Assignee: The Boeing Company, Seattle, WA (US)

(*) Notice: Under 35 U.S.C. 154(b), the term of this patent shall be extended for 0 days.

(21) Appl. No.: 09/182,757

(22) Filed: Oct. 29, 1998

(51) Int. Cl.$^7$ .................................................... B29C 51/42
(52) U.S. Cl. ............................ 425/384; 425/394; 425/407
(58) Field of Search .................................. 425/384, 407, 425/394, 398; 264/316

(56) References Cited

U.S. PATENT DOCUMENTS

| | | |
|---|---|---|
| 2,385,544 | 9/1945 | Salisbury . |
| 2,443,596 | 6/1948 | Cahill . |
| 2,456,675 | 12/1948 | Chaille . |
| 2,783,815 | 3/1957 | Tegarden . |
| 2,882,952 | 4/1959 | Johnson . |
| 3,557,277 | 1/1971 | Broderson et al. . |
| 3,655,475 | 4/1972 | Stelling, Jr. et al. . |
| 3,658,974 | 4/1972 | Low . |
| 3,871,811 * | 3/1975 | Barry et al. ............................ 425/407 |
| 4,160,006 | 7/1979 | Patzner et al. . |
| 4,267,140 * | 5/1981 | Meeker ................................. 264/291 |
| 4,350,551 | 9/1982 | Michaelson . |
| 4,354,812 * | 10/1982 | Wieder et al. ........................ 425/144 |
| 4,622,190 | 11/1986 | Schultz . |
| 4,789,328 | 12/1988 | Knoll . |
| 4,883,632 | 11/1989 | Goto et al. . |
| 4,885,317 | 12/1989 | Thein et al. . |
| 4,946,640 | 8/1990 | Nathoo . |
| 4,957,577 | 9/1990 | Huebner . |
| 5,084,226 | 1/1992 | Tarlton et al. . |
| 5,119,535 | 6/1992 | Gnagy et al. . |
| 5,179,998 * | 1/1993 | Des Champs ............................ 165/1 |
| 5,329,101 * | 7/1994 | Ellis ...................................... 219/632 |
| 5,385,699 | 1/1995 | Numoto et al. . |
| 5,509,275 * | 4/1996 | Bhatti et al. ............................ 62/271 |
| 5,529,480 | 6/1996 | Ross et al. . |
| 5,666,742 * | 9/1997 | Greves et al. .......................... 34/218 |
| 5,780,074 | 7/1998 | Blonigen et al. . |

FOREIGN PATENT DOCUMENTS

| | | |
|---|---|---|
| 4130620A1 | 3/1993 | (DE) . |
| 0393767 | 10/1990 | (EP) . |
| 53112-960 | 10/1978 | (JP) . |
| 84-066262 | 5/1991 | (JP) . |
| WO 93/01044 * | 1/1993 | (JP) ...................................... 425/407 |
| WO95/03933 | 2/1995 | (WO) . |

* cited by examiner

*Primary Examiner*—Harold Pyon
*Assistant Examiner*—Emmanuel Luk
(74) *Attorney, Agent, or Firm*—Christensen O'Connor Johnson Kindness PLLC

(57) ABSTRACT

An apparatus for shaping a preheated settable material is provided. The apparatus includes an upper die (38) located in a forming area (34), opposed tensioning assemblies (40), (42), a flexible support (54) rotatably connected between the opposed tensioning assemblies for supporting the settable material, and a regulation system operably engaged with the opposed tensioning assemblies for maintaining tension between the opposed tensioning assemblies. During use, the settable material is shaped by the relative pressing between the upper die and one of the flexible support and a lower die. An improvement is provided including a flexible support having a plurality of openings and a cooling system (60). The cooling system directs cool air to the settable material during a cool down period. The cool air is provided in the forming area at a location beneath the flexible support so that cool air passes upward through the plurality of openings in the flexible support and to the settable material.

10 Claims, 7 Drawing Sheets

APPARATUS FOR SHAPING HONEYCOMB CORE

FIELD OF THE INVENTION

The present invention relates to methods and apparatus for shaping settable materials, and more particularly to a method and apparatus for shaping flat honeycomb core into a contour shape.

BACKGROUND OF THE INVENTION

One known method of shaping honeycomb core includes placing the core on a series of horizontal support rods and sliding the combination into an oven. The core is heated to its forming temperature, i.e., the particular temperature at which the core becomes shape-able. Once the core is properly heated, the support rods and core are removed from the oven and the rods are retracted laterally to either side. This causes the core to fall loosely onto a lower die. A worker then correctly aligns the core relative to the die. The heated core is pressed for a period of time between the lower die and an upper die that is shaped in the reverse-image of the lower die (i.e., male/female die pair). The upper and lower dies continue to hold the core until it cools in the ambient air to a set temperature. Once set, the dies recede, and the shaping process is complete.

There are a number of disadvantages associated with the above method. A first disadvantage is that extra energy is required to heat the core in order to compensate for heat lost during transfer of the core from the rods to the lower die and heat lost to the dies during pressing. The core must be heated to a particular temperature in order to bring it to a malleable state. Even if the initial temperature of the core is correctly adjusted, the forming temperature is adversely affected because the dies continue to absorb heat from the core during pressing. This reduces the amount of time available for pressing the core at the required forming temperature. A second disadvantage is that after the core is pressed at its proper forming temperature, the core must be allowed to cool to a particular temperature while still being held at its new shape. If the core is released prior to reaching this set temperature, it will tend to return (i.e., spring back) toward its original shape. This cool down period is longer than desired when using the above method due to the slow rate of heat dissipation from the upper and lower dies.

Many of these disadvantages are addressed in the method and apparatus described in U.S. Pat. No. 5,780,074. In particular, the '074 patent describes an embodiment for forming a settable material in which the material is placed on a flexible support, transferred to and from an adjacent oven, and then pressed between the flexible support and an upper male die. After pressing, the flexible support and upper die continue to hold the core until it has cooled in the ambient air to its set temperature. Once cooled, the upper die recedes. Shaping of the material is complete. The '074 patent thus reduces the problems associated with core heat loss prior to and during forming. The '074 patent also reduces the cool down time required for setting the material, since the flexible support dissipates heat much faster than a (typically metal) lower die.

If has been found in using the above '074 process, however, that the production time required to manufacture a large number of shaped panels is unacceptably high. This is partly due to the time required to ambiently cool the material to its set temperature while being held in its new shape. The '074 addressed this need in part, by providing an embodiment in which the lower, female die is eliminated. This allows heat to dissipate more quickly from the core, thus causing it to reach its set temperature faster. The upper, male die, however, yet remains as an impediment to the dissipation of heat from the core. Therefore, a continued need for a shaping method and apparatus exists that provides faster, more efficient technique for bringing the core to its set temperature during the cool down period. The present invention is directed to fulfilling this need.

SUMMARY OF THE INVENTION

In accordance with aspects of the present invention, an improvement to an apparatus for shaping a layer of settable material is described. The apparatus includes an upper die located in a forming area, opposed tensioning assemblies, a flexible support rotatably connected between the opposed tensioning assemblies for supporting the settable material, and a regulation system operably engaged with the opposed tensioning assemblies for maintaining tension between the opposed tensioning assemblies. During use, the settable material is shaped by the relative pressing between the upper die and the flexible support. An improvement is provided that includes a plurality of openings in the flexible support and a cooling system for providing cool air to the settable material during a cool down period. The cool air is provided in the forming area at a location beneath the flexible support so that during use the cool air passes through the plurality of openings in the flexible support to the settable material.

In accordance with other aspects of this invention, one embodiment is provided in which the cooling system includes first and second air conditioning units, first and second cool air plenums, and ducting connecting the first cool air plenum with the first air conditioning unit and the second cool air plenum with the second air conditioning unit. The first and second cool air plenums are oriented to face one another from opposed sides of the forming area beneath the flexible support. The plenums are adapted to direct cool air through the flexible support at the position of the settable material.

In accordance with further aspects of this invention, a second embodiment is provided in which the cooling system includes a number of air conditioning units, a cool air output grate connected to the number of air conditioning units. The grate is located in the forming area beneath the flexible support (such as in the floor). The grate is positioned to direct cool air through the flexible support at the position of the settable material.

In accordance with still other aspects of this invention, the present invention further includes inhibiting the transfer of heat into the forming area by placing one or more insulating skirts about the forming area. In one embodiment, the present invention further includes temperature sensing means insertable in the settable material prior to pressing. The temperature sensing means indicate when the settable material has reached its formed temperature. In one embodiment a control system automatically controls the level of cool air output from the cooling system using the information received from the temperature sensing means.

In accordance with still further aspects of this invention, an improvement to a method of shaping a layer of settable material, such as a honeycomb core, is provided. The method includes placing the layer of settable material on a flexible support, translating the flexible support with settable material to a heat source, heating the settable material to a desired forming temperature, translating the flexible support with settable material from the heat source to an adjacent forming area, and pressing the settable material using a die having a particular shape. The pressing occurs between the die and the flexible support by tensioning the flexible support so that the settable material is forced to conform to the shape of the die. An improvement is provided including using a flexible support having a plurality of openings therethrough and cooling the settable material using a cooling system. The cooling system includes one or more cool air plenums positioned in the forming area at a location beneath the flexible support.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Although the following detailed description of the presently preferred embodiment of the invention is presented with reference to a settable material in the form of a layer of honeycomb core, it is to be understood that other settable materials (e.g., foam sheets, thermoplastic sheets, etc.) may benefit from use of the present invention. Therefore, the use herein of honeycomb core is meant to be illustrative and not limiting.

The general method and apparatus of the present invention involves placing a layer of honeycomb core on a flexible support, translating the flexible support and core into an oven, and heating the core to its proper forming temperature in the oven. Once core heating is accomplished, the support and core are translated from the oven into an adjacent forming area. At the forming area, an upper die is vertically lowered onto the core, pushing the core and the flexible support downward. Tensioning assemblies maintain the tension of the flexible support so that the core is pressed for a period of time between the upper die and the flexible support and is thereby forced to conform to the shape of the upper die. The honeycomb core is then maintained between the flexible support and the upper die while a cooling system blows cool air at the underside of the flexible support. The cool air passes through the support openings, directly to the honeycomb core. In this manner, cooling of the core is accomplished much faster. Using this technique, a larger production rate of the core panels is realizable without detriment to the quality of the shaped core. Once the core is cooled sufficiently, the die recedes and the finished core may be removed.

Figure 1:
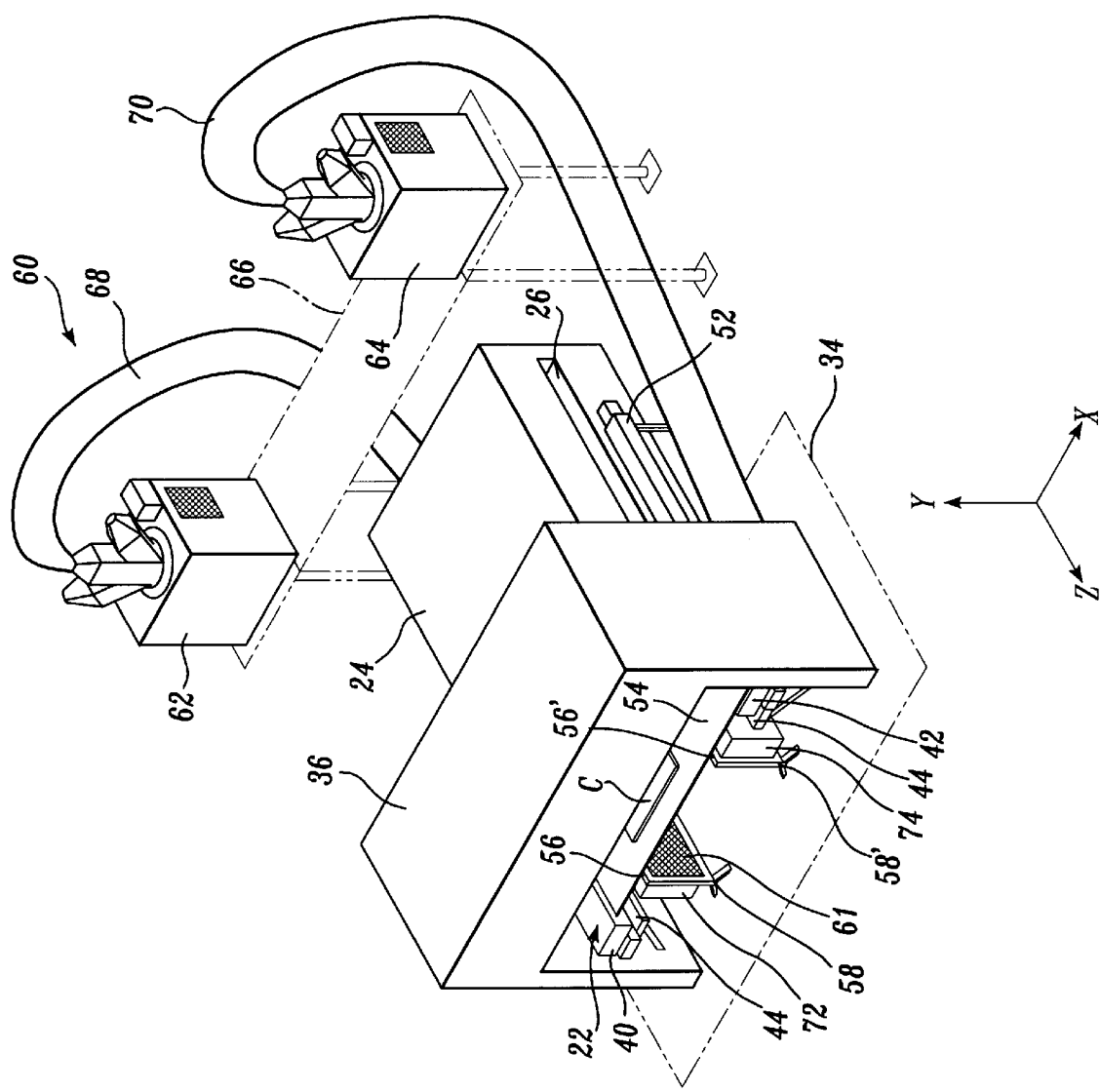
FIG. 1 is a perspective view of one embodiment of a shaping apparatus formed in accordance with the present invention.
Figure 2:
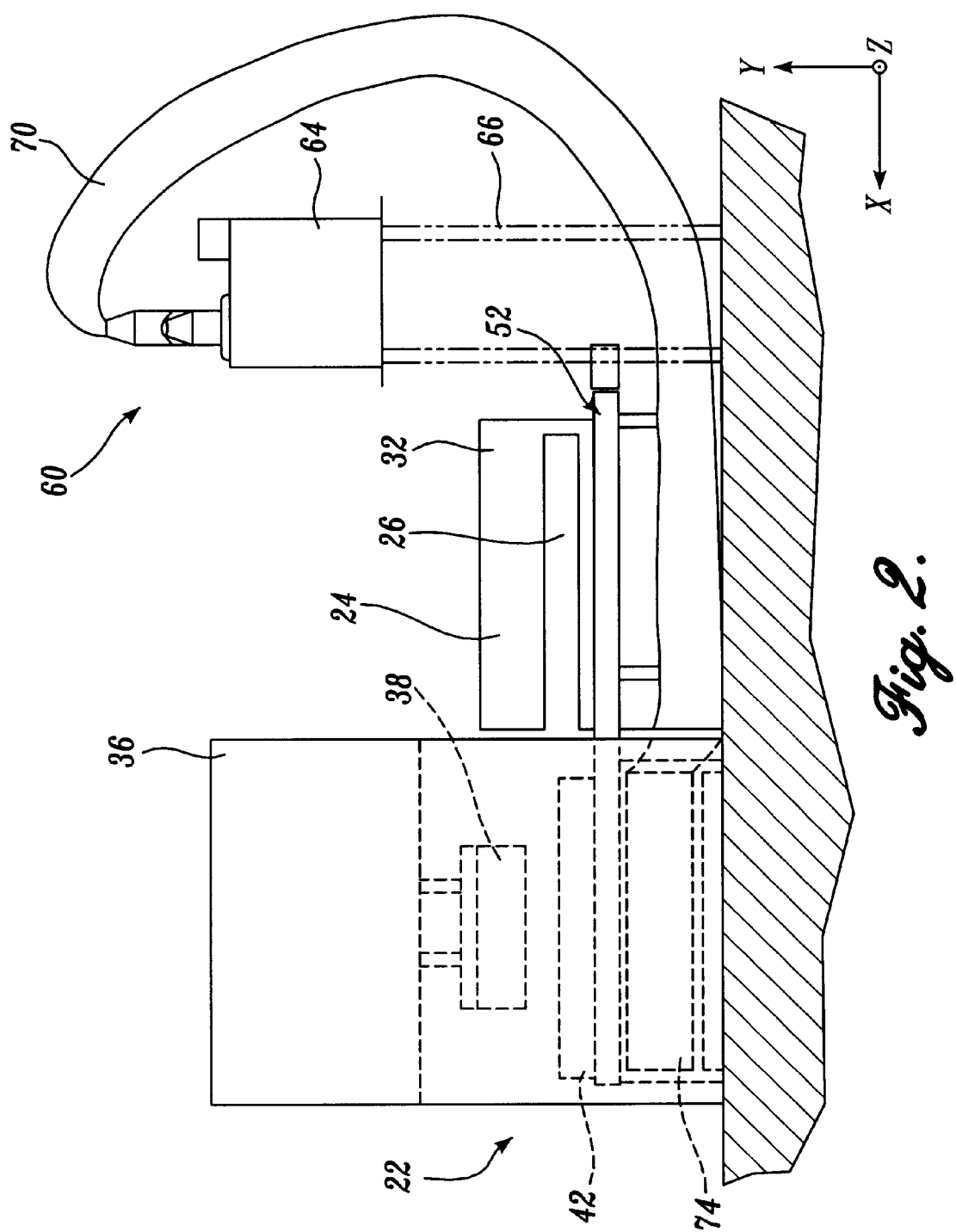
FIG. 2 is a side elevational view of the arrangement of FIG. 1.

In more detail FIG. 1 illustrates one embodiment of a shaping apparatus 22 formed in accordance with the present invention. A conventional oven 24 is provided having a horizontal opening 26 for receiving items to be heated. As shown best in FIGS. 2 and 3, the oven has a front side 28, a left side 30, and a right side 32. The horizontal opening 26 extends around the left, front, and right sides of the oven. Referring back to FIG. 1, a forming area 34 is defined by the region directly adjacent the oven front side 28. The shaping apparatus 22 is located in the forming area 34 and includes a die assembly 36 having a vertically translatable upper male die 38. The male die preferably includes a perforated face sheet. The vertical translation of the upper die 38 may be accomplished using any one of a number of known methods and power supplies.

Figure 3:
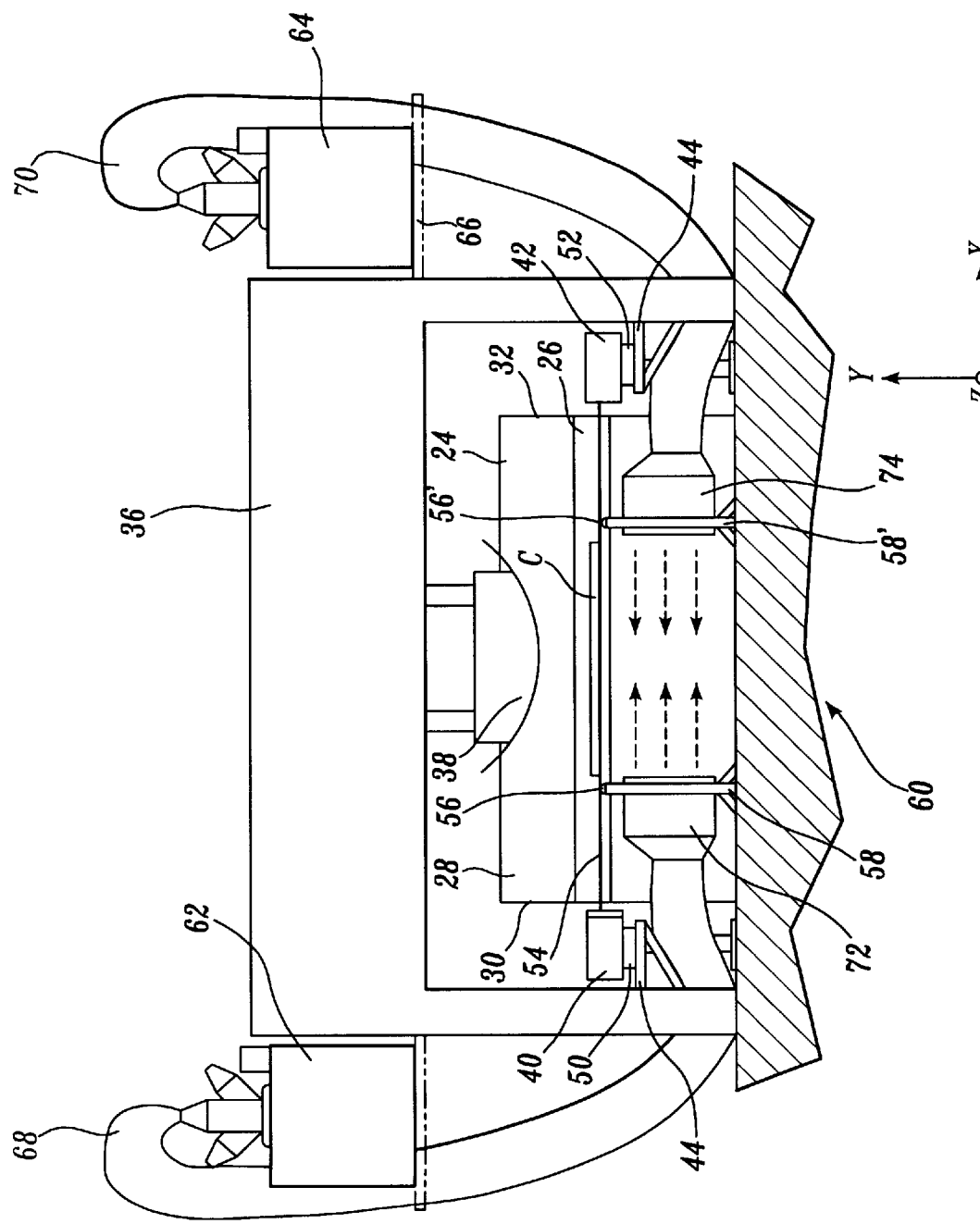
FIG. 3 is a front elevational view of the arrangement of FIG. 1.

Referring to FIG. 3, the shaping apparatus 22 includes first and second tensioning assemblies 40, 42. The tensioning assemblies are each supported by a shelf 44 at a height sufficient to allow the flexible support and core to translate into and out of the oven horizontal opening 26 without contacting the oven surfaces. The translation of the tensioning assemblies is accomplished by first and second guide assemblies 50, 52, respectively. The assembly sets are generally oriented parallel to and near the oven left and right sides 30, 32, respectively. A regulation system (not shown) coordinates opposed forces produced within and between the first and second tensioning assemblies 40, 42. Various configurations of tensioning assemblies, guide assemblies, and regulation systems may be used, such as those described in U.S. Pat. No. 5,780,074 and incorporated herein by reference. The guide assemblies include conventional translation means to move the tensioning assemblies in a fore and aft direction. The guide assemblies are synchronized to ensure that translation of the tensioning assemblies is performed in unison.

Still referring to FIG. 3, a flexible support 54 is located between the tensioning assemblies 40, 42 and below the upper male die. The support 54 includes two side ends, one end being engaged by the first tensioning assembly 40, the other end being engaged by the second tensioning assembly 42. Any additional amounts of flexible support material required during pressing are provided and regulated through the tensioning assemblies. The flexible support includes a plurality of openings so as to facilitate the transfer of heat into and out of the honeycomb core during heating and cooling, respectively. The flexible support is formed from a heat resistant flexible material. One material that has yielded good results for shaping honeycomb core is a fine-link stainless steel wire mesh capable of withstanding at least 750° F. Other materials are possible for use in the flexible support.

Referring to FIG. 3, the shaping apparatus 22 includes optional first and second support rollers 56, 56'. The support rollers 56, 56' promote proper pressing of the core about the upper die. This is particularly useful when the die is narrow in width compared with the distance between the tensioning assemblies. Shown in FIGS. 1 and 3, the support rollers 56, 56' are mounted on vertically adjustable frames 58, 58' that are supported by the floor. The support rollers and frame may be configured according to any one of a number of methods. The example configurations shown in FIGS. 1 and 3 are weighted horses having the support rollers 56, 56' attached to a single rod that forms the upper horse cross member. The support rollers 56, 56' and frames 58, 58' are positioned under the flexible support 54 so that the rollers contact the underside of the flexible support. The support rollers 56, 56' are spaced laterally outward from directly beneath the edges of the upper die.

Figure 6:
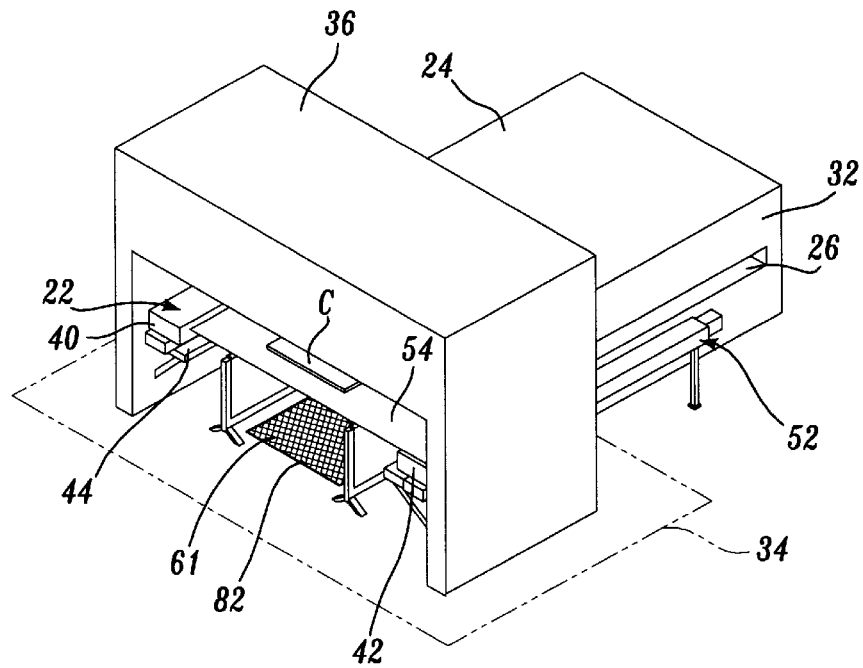
FIG. 6 is a perspective view of a second embodiment of a shaping apparatus formed in accordance with the present invention.
Figure 7:
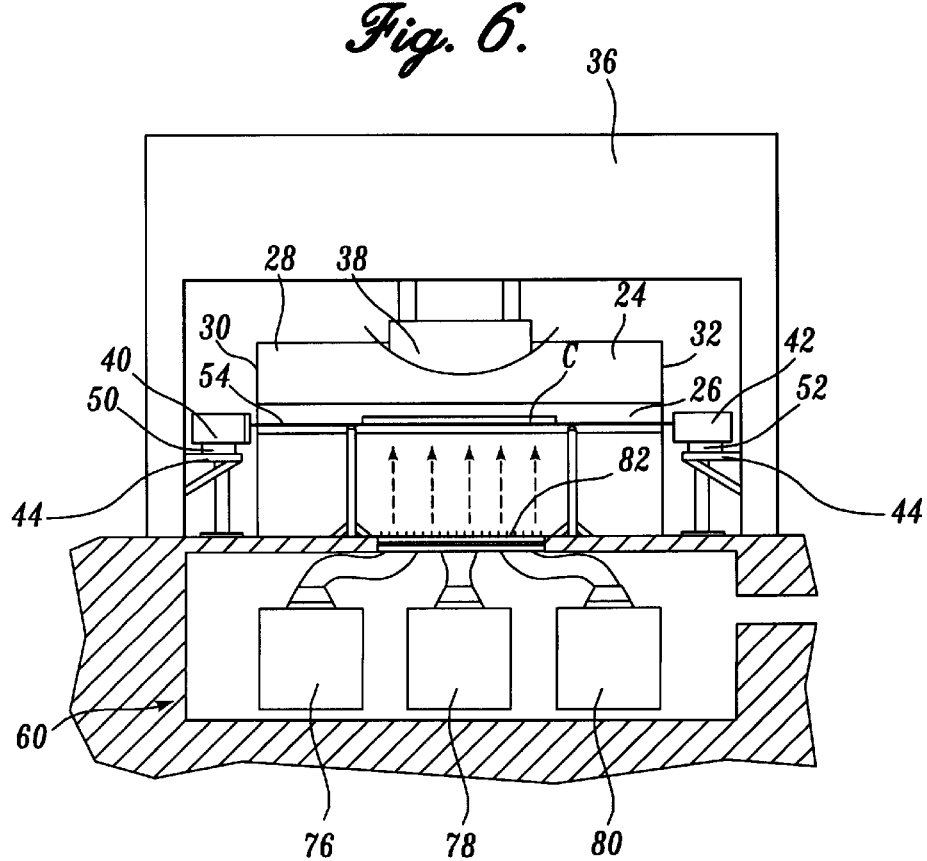
FIG. 7 is a front elevational view of the arrangement of FIG. 6.

The shaping apparatus 22 further includes a cooling system 60 for directing cool air to the core during the cool down period, thereby lowering the core temperature to its set temperature without compromising core quality and without having to wait long periods of time. FIGS. 1–5 illustrate is one embodiment of a cooling system formed in accordance with the present invention. FIGS. 6 and 7 illustrate a second embodiment of a cooling system. A number of variations in the arrangement of components is possible, depending on the space available and the equipment required.

Referring to the embodiment of FIG. 1, first and second air conditioning units 62, 64 are provided at a location away from the oven 24. The term air conditioning unit as used herein referes broadly to any type of device capable of producing cool air. In one configuration, the air conditioning units are ten ton air conditioners, with a total capacity to produce cool air in an amount in the range of about 2500 cfm to about 5000 cfm. In FIG. 1, the units are shown on an elevated support structure 66 located aft of the oven 24. Ducts 68, 70 connect the output of the first and second air conditioning units with first and second plenums 72, 74, respectively. The plenums 72, 74 are located below the flexible support 54, laterally outward of the upper die sides. In the embodiment of FIG. 1, the first and second cool air plenums units face one another. The plenums are supported by the two support structures 58, 58'. Adjustable louvers 61 are provided at the opening of each plenum to direct air in a desired direction.

Figure 4:
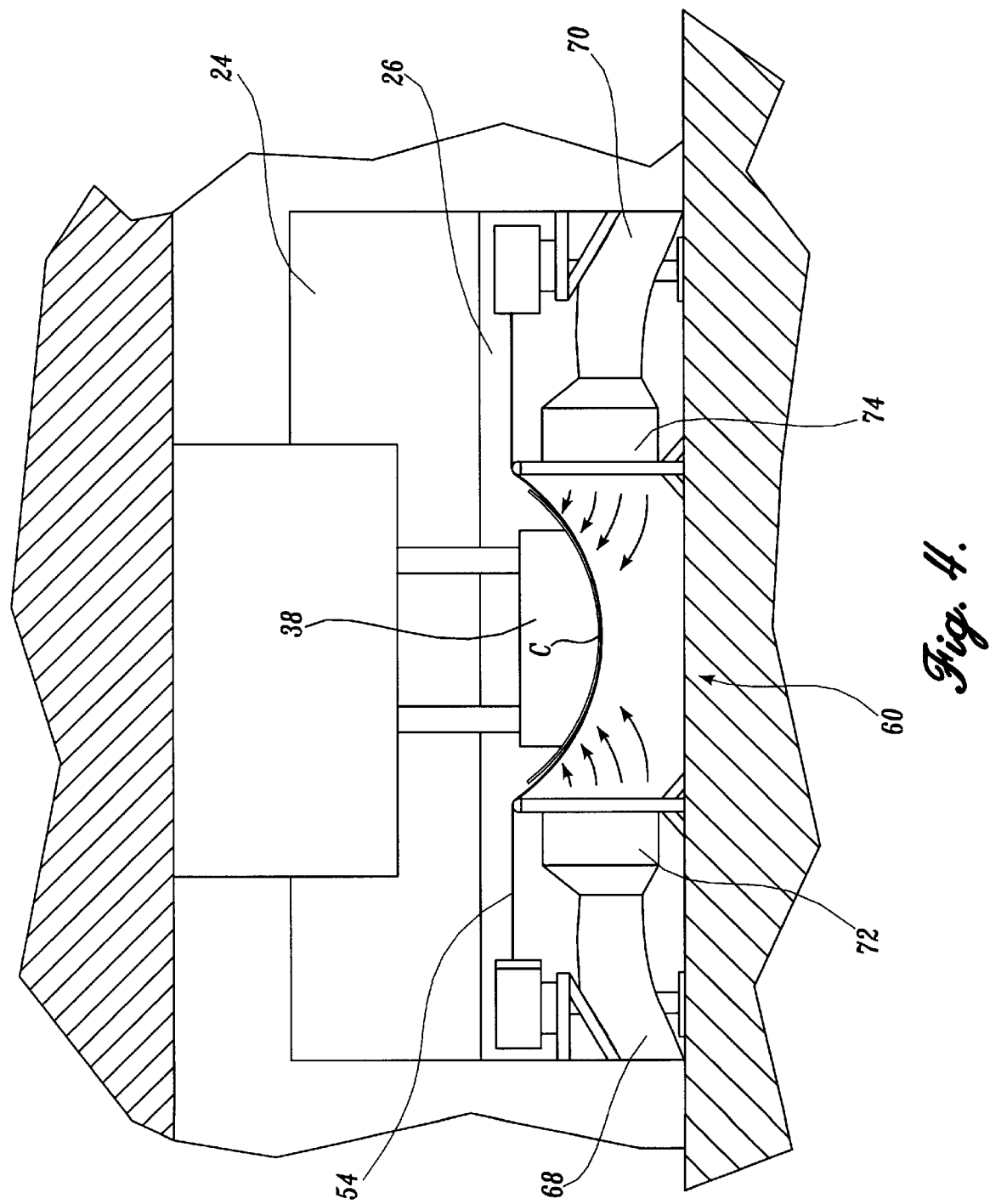
FIG. 4 is a side elevational view of portions of the shaping apparatus during the cool down period.

Referring to FIG. 4, in operation, the honeycomb core is placed on the flexible support 54. The guide assemblies translate the combined core and the flexible support horizontally aftward into the oven 24 via the oven opening 26. Because the oven opening extends around the oven front, left, and right sides, the flexible support 54 is translated into the oven without contacting the oven. A portion of the support and the tension assemblies extend horizontally out from the sides of the oven opening. The core is therein heated to its forming temperature.

Afterward being heated, the core and flexible support are translated horizontally out of the oven 24 and back into the forming area 34. The upper die 38 is lowered onto the core, the upper die pressing the core into the flexible support. The first and second tensioning assemblies 40, 42 maintain the tension on the flexible support 54 so that the core is forced to conform to the shape of the upper die 38. After a specified period of time required to form the core at the forming temperature during pressing, the air conditioning units 62, 64 are activated to output cool air from their respective plenums 72, 74. The cool air is directed to the underside of the flexible support where it passes through the support openings and directly cools the core. The plenum louvers 61 may be adjusted to optimize the direction of the cool air so that it hits all parts of core. As shown in FIG. 4, the cooling area has a width greater than the width of the upper die. During the cool down period, the cool air can move upward around the sides of the upper die through the opening in the flexible support to help cool the upper die. The cool air is provided for a specified period of time, i.e., until the core reaches, or is thought to have reached, its set temperature. The die recedes and the shaping process is complete.

A second embodiment of a cooling system formed in accordance with the present invention is illustrated in FIGS. 6 and 7. In this arrangement, a number of air conditioning units 76, 78, 80 are positioned away from the oven (shown beneath the forming area in FIG. 7.) The air conditioning cool air output is ducted to a grate 82 in the floor at a location directly beneath the core. The grate preferably includes adjustable louvers as well. During use, the cool air is blown upward, directly at the flexible support and core.

Figure 8:
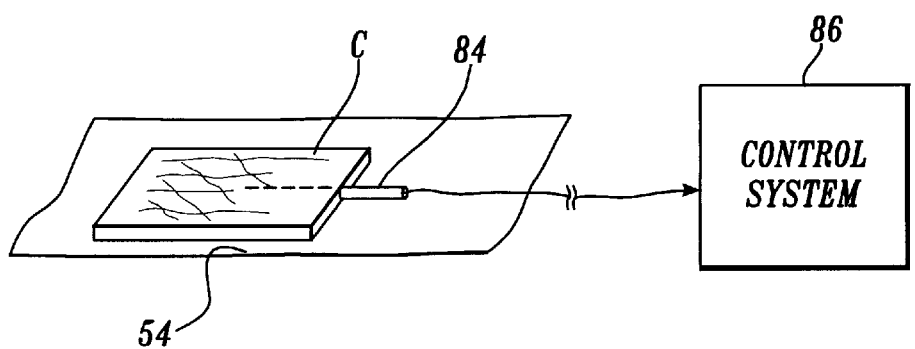
FIG. 8 is a perspective view of a temperature sensing means formed in accordance with the present invention.

There are a number of enhancements to the basic process described above that help yield even faster cool down periods. Referring to FIG. 8, a conventional temperature sensing means 84 is provided and is inserted into the core prior to the cool down period. The means are preferably inserted prior to the heating of the core, so that an operator does not have to work with extremely hot core. Example types of sensing means 84 include a high-temperature thermometer (e.g., capable of sensing temperature in a range of about 450° F. to about 800° F.), a thermocouple wire, an infra-red temperature sensor, etc. The actual temperature of the core is then used to determine the length of time to be spent in heating, in forming, and in cooling. Once the core has reached a particular temperature, an indicator (bell, light, readout, etc.) alerts an operator that the core is formed.

Figure 9:
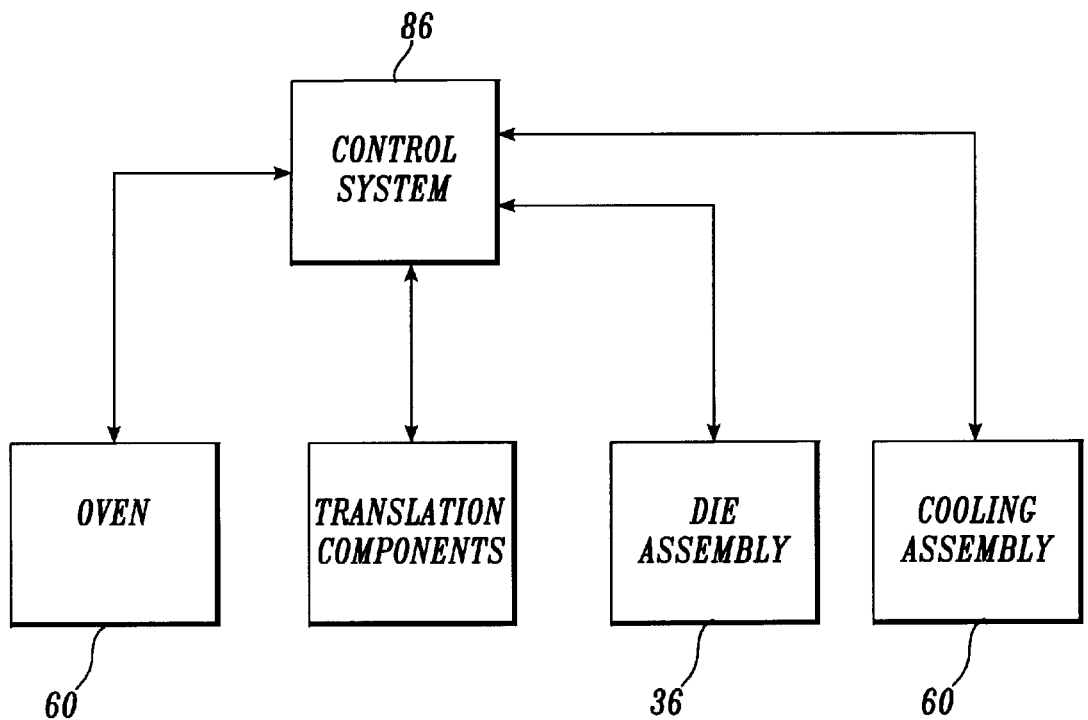
FIG. 9 is a schematic illustrating one embodiment of a control system formed in accordance with the present invention for use in coordinating the shaping of the settable material.

In an alternative embodiment, the temperature sensing means is in communication with a control system 86 capable of regulating the cool air output of the cooling system. Thus, the control system automatically adjusts the level of cool air output according to temperature of the core as obtained from the temperature sensing means. This technique is particularly useful when more than one kind of settable material is being shaped. If only one kind of material is used, then the process may be conducted using set periods of time. Referring to FIG. 9, the control system may be further in communication with the oven 24, the translation components (i.e., the tensioning, guide, and regulating assemblies), and the die assembly 36. This arrangement results in a near complete automation of the shaping process.

When shaping honeycomb core having a thickness of up to 4 inches, the following parameters have yielded acceptable results: the core is placed in the oven until the desired core temperature is reached, the core is restrained and cooled until the desired core set temperature is reached. For honeycomb core panels, cool air is provided until the core reaches a temperature of about 120° F. or less.

Another enhancement is to blow air about the male die perforated face sheet simultaneous with the use of the air conditioning units. Even perforations as small as 0.125 inches are helpful in dissipating heat more quickly from the upper die and ultimately reducing the cool down time period.

Figure 5:
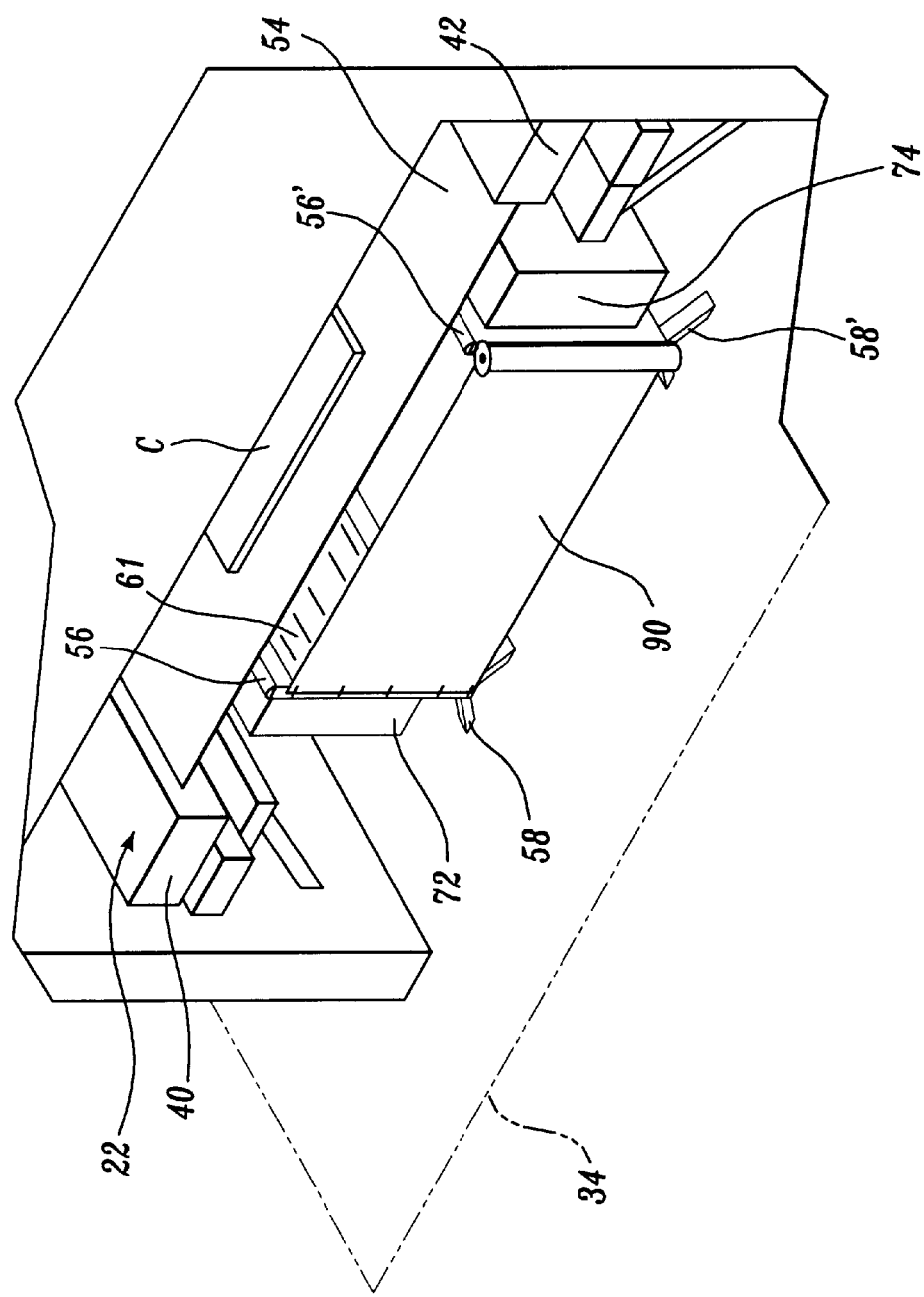
FIG. 5 is a perspective view of an insulating skirt formed in accordance with the present invention.

Referring to FIG. 5, another enhancement includes one or more insulating skirts 90 to keep cool air directed to the core and to inhibit the flow of heat into the cooling area. The skirt 90 illustrated in FIG. 5 is a retractable Kevlar panel positioned in front of the forming area and connected between the roller support structures 58, 58'. A second skirt (not shown) is provided between the forming area and the oven. Other arrangements of the plenums and skirts are possible, particularly where support structures are not used.

As will be appreciated by those skilled in the art, the present invention reduces the cycle time required to cool the core during the forming process. This maximizes the total efficiency of the core forming process, resulting in greater shaping production in less time. While the preferred embodiment of the invention has been illustrated and described, it will also be appreciated that various changes can be made therein without departing from the spirit and scope of the invention. For example, the cooling system may be used with a die having both male and female surfaces. In such instances, the cooling system must be positioned to optimize the flow of cool air to the core and the cooling level must be adjusted to account for the additional die member.

The embodiments of the invention in which an exclusive property or privilege is claimed are defined as follows:

1. In an apparatus for shaping a preheated settable material, the apparatus including: an upper die located in a forming area; opposed tensioning assemblies; a flexible support rotatably connected between the opposed tensioning assemblies for supporting the settable material the flexible support having a plurality of openings; and a regulation system operably engaged with the opposed tensioning assemblies for maintaining tension between the opposed tensioning assemblies, during use the settable material being shaped by the relative pressing between the upper die and the flexible support; an improvement comprising:

a cooling system for actively providing cool air to the settable material during a cool down period, the cool air being provided in the forming area at a location beneath the flexible support, wherein the flexible support and the forming area are both of a width greater than the width of the upper die so that during use, cool air passes through the plurality of openings in the flexible support to directly reach both the settable material and the upper die, thereby immersing the combination in cool air;

wherein the cooling system comprises:
   (a) first and second air conditioning units;
   (b) first and second cool air plenums, the first and second cool air plenums being located to face one another from opposed sides of the forming area beneath the flexible support, the plenums being adapted to direct cool air at the flexible support at the position of the settable material; and
   (c) ducting connecting the first cool air plenum with the first air conditioning unit and the second cool air plenum with the second air conditioning unit.

2. The improvement according to claim 1, wherein the cooling system includes one or more insulating skirts to keep the cool air in the cooling area and inhibit the flow of heat into the cool air.

3. The apparatus according to claim 1, further comprising temperature sensing means insertable in the settable material prior to pressing, the temperature sensing means for indicating when the settable material has reached its formed temperature.

4. In an apparatus for shaping a preheated settable material the apparatus including: an upper die located in a forming area; opposed tensioning assemblies; a flexible support rotatable connected between the opposed tensioning assemblies for supporting the settable material, the flexible support having a plurality of openings; and a regulation system operably engaged with the opposed tensioning assemblies for maintaining tension between the opposed tensioning assemblies, during use the settable material being shaped by the relative pressing between the upper die and the flexible support; an improvement comprising:

a cooling system for actively providing cool air to the settable material during a cool down period, the cool air being provided in the forming area at a location beneath the flexible support wherein the flexible support and the forming area are both of a width greater than the width of the upper die so that during use, cool air passes through the plurality of openings in the flexible support to directly reach both the settable material and the upper die, thereby immersing the combination in cool air;

wherein the cooling system comprises:
   (a) a plurality of air conditioning units; and
   (b) a cool air output grate connected to the plurality of air conditioning units and located in the forming area beneath the flexible support, the grate being positioned to direct cool air through the flexible support at the position of the settable material.

5. The improvement according to claim 4, wherein the cooling system includes one or more insulating skirts to keep the cool air in the cooling area and inhibit the flow of heat into the cool air.

6. The apparatus according to claim 4, further comprising temperature sensing means insertable in the settable material prior to pressing, the temperature sensing means for indicating when the settable material has reached its formed temperature.

7. The apparatus according to claim 1, the plurality of air conditioning nits are adapted to provide cool air at a temperature n the range of about 40° F. to about 50° F.

8. The apparatus according to claim 1, further comprising a control system for automatically controlling the level of cool air output from the cooling system.

9. The apparatus according to claim 4, wherein the plurality of air conditioning units are adapted to provide cool air at a temperature in the range of about 40° F. to about 50° F.

10. The apparatus according to claim 4, further comprising a control system for automatically controlling the level of cool air output from the cooling system.

* * * * *

UNITED STATES PATENT AND TRADEMARK OFFICE
CERTIFICATE OF CORRECTION

PATENT NO. : 6,186,766 B1
DATED : February 13, 2001
INVENTOR(S) : R.M. Davis et al.

It is certified that error appears in the above-identified patent and that said Letters Patent is hereby corrected as shown below:

Column 7,
Line 14, (claim 1, line 5), "material" should read -- material, --
Line 43, (claim 2, line 1), "improvement" should read -- apparatus --
Line 53, (claim 4, line 2), "rial" should read -- rial, --

Column 8,
Line 2, (claim 4, line 4), "rotatable" should read -- rotatably --
Line 14, (claim 4, line 15), "support" should read -- support, --
Line 29, (claim 5, line 1), "improvement" should read -- apparatus --
Line 39, (claim 7, line 2), "nits" should read -- units --
Line 40, (claim 7, line 3), "perature n" should read -- perature in --

Signed and Sealed this

Sixteenth Day of October, 2001

*Attest:*

*Attesting Officer*

NICHOLAS P. GODICI
*Acting Director of the United States Patent and Trademark Office*